US009511836B2

United States Patent
Berrang et al.

(10) Patent No.: US 9,511,836 B2
(45) Date of Patent: Dec. 6, 2016

(54) IN-FLIGHT KITE DEFLATION AND CONTROL SYSTEMS

(75) Inventors: Peter G. Berrang, Saanichton (CA); Ross D. Harrington, Victoria (CA); Richard K. Myerscough, Victoria (CA)

(73) Assignee: OCEAN RODEO SPORTS INC., Saanichton (CA)

( * ) Notice: Subject to any disclaimer, the term of this patent is extended or adjusted under 35 U.S.C. 154(b) by 194 days.

(21) Appl. No.: 14/386,324

(22) PCT Filed: Mar. 27, 2012

(86) PCT No.: PCT/CA2012/000321
§ 371 (c)(1),
(2), (4) Date: Jan. 19, 2015

(87) PCT Pub. No.: WO2013/142949
PCT Pub. Date: Oct. 3, 2013

(65) Prior Publication Data
US 2015/0129721 A1 May 14, 2015

(51) Int. Cl.
*B63H 9/06* (2006.01)
*B64C 31/06* (2006.01)
(Continued)

(52) U.S. Cl.
CPC ......... *B63H 9/0685* (2013.01); *B63B 35/7979* (2013.01); *B64C 31/06* (2013.01);
(Continued)

(58) Field of Classification Search
CPC .... B63H 9/0685; B63B 35/7979; B64C 31/06
See application file for complete search history.

(56) References Cited

U.S. PATENT DOCUMENTS 4,708,078 A * 11/1987 Legaignoux ........ B63B 35/7976
114/102.23
5,366,182 A * 11/1994 Roeseler ............... B62B 15/002
114/102.11
(Continued)

FOREIGN PATENT DOCUMENTS

CA 1170638 A1 7/1984
EP 0222263 A1 5/1987
(Continued)

OTHER PUBLICATIONS

International Search Report and Written Opinion dated Dec. 20, 2012, 11 pages.
(Continued)

*Primary Examiner* — Justin Benedik
(74) *Attorney, Agent, or Firm* — ARC IP LAW, PC; Joseph J. Mayo

(57) ABSTRACT

A massive de-powering system for a kite wing used in kite boarding comprises a deflation control line that connects to a valve on the kite wing's leading edge bladder. In the preferred embodiment, disengaging the tether line from the harness causes the deflation control line to tension and to open the valve, thereby deflating the bladder. Tension along the deflation control line may also act to draw in spaced portions of the wing thereby collapsing it and further reducing the power generated by the wing.

16 Claims, 19 Drawing Sheets

(51) Int. Cl.
*B63B 35/79* (2006.01)
*A63C 5/11* (2006.01)
*A63C 17/26* (2006.01)
*B62B 15/00* (2006.01)

(52) U.S. Cl.
CPC .............. *A63C 5/11* (2013.01); *A63C 17/267* (2013.01); *B62B 15/002* (2013.01); *B62B 15/003* (2013.01); *B63H 2009/0692* (2013.01); *B64C 2031/065* (2013.01)

(56) References Cited

U.S. PATENT DOCUMENTS

| | | | | |
|---|---|---|---|---|
| 6,520,454 | B2* | 2/2003 | Winner | A63H 27/002 244/155 A |
| 6,691,954 | B1* | 2/2004 | Harrington | B63B 35/7933 244/155 A |
| 6,837,463 | B2* | 1/2005 | Lynn | B64C 31/06 244/146 |
| 7,017,860 | B2* | 3/2006 | Royannais | B63B 35/7979 244/155 A |
| 7,032,864 | B2* | 4/2006 | Logosz | B64C 31/06 244/146 |
| 7,036,771 | B1* | 5/2006 | Pouchkarev | B63B 35/7979 244/152 |
| 7,093,803 | B2* | 8/2006 | Culp | B63H 9/0685 244/145 |
| 7,494,093 | B2* | 2/2009 | Legaignoux | B63B 35/7979 244/145 |
| 8,096,510 | B2* | 1/2012 | Shogren | B63B 35/7976 244/153 R |
| 8,534,609 | B2* | 9/2013 | Stiewe | B64C 31/06 244/145 |
| 8,814,098 | B2* | 8/2014 | Hastilow | B63B 35/7979 114/39.16 |
| 2004/0004160 | A1 | 1/2004 | Pouchkarev | |
| 2004/0188567 | A1 | 9/2004 | Logosz | |
| 2006/0097114 | A1 | 5/2006 | Goodman | |
| 2006/0163433 | A1 | 7/2006 | Beckingham | |

FOREIGN PATENT DOCUMENTS

| | | | | |
|---|---|---|---|---|
| FR | 2841213 A1 | 12/2003 | | |
| FR | 2898582 A1 * | 9/2007 | ............ | B64C 31/06 |
| JP | 2003026098 A | 1/2003 | | |

OTHER PUBLICATIONS

"Total Depower Option for 2012 Ozone Snowkites", Kite Gear Review, www.desertwindkiteboarding.com, Nov. 2, 2011.
International Preliminary Report on Patentability and Written Opinion, dated Oct. 23, 2014, 9 pages.

* cited by examiner

IN-FLIGHT KITE DEFLATION AND CONTROL SYSTEMS

FIELD OF THE INVENTION

The invention relates to a safety system for use in kite sports.

BACKGROUND OF THE INVENTION

Kite boarding, sometimes also referred to as kite surfing, is an extreme sport whereby a person uses a kite, generally having a "C" or modified "C" shape. Such shape, also termed "a leading edge inflatable kite", is created by using a hand or electrically operated pump to inflate an elastomeric bladder contained within a protective cover material forming the kite's leading edge. The kite's leading edge, which forms a rigid C-shaped 4-8 inch diameter round tube when inflated, also has one or more orthogonally aligned abutting struts, which structure supports the fabric material forming the kite canopy. Kites are deflated for packaging and transport. During use, the kite's leading edge and struts are inflated to about 3-8 lbs. above ambient atmospheric pressure. The leading edge bladder and struts can be inflated simultaneously, or separately.

Without inflation, or low inflation, a kite becomes floppy in the water, with some wind drag, but cannot create an aerodynamic shape.

Modern prior art kites are attached to 4 (or 5) lines, which lines are generally 10-30 meters in length, and are also attached (tethered) to the kite rider, who is wearing a special harness, allowing the kite rider, while standing on a surfboard-like device, to be pulled along the surface of the water due to wind powering the kite.

Besides water-based kite boarding, kites are also used on land where the rider stands on a skateboard type device (with wheels) travelling on, for example, packed sand, or sitting in a device with wheels for travel over a hard surface. Recently, kites have also been deployed by snow boarders for use over snow-covered areas.

U.S. Pat. No. 4,708,078 by Legaignoux, et al. teaches the first use of a kite design that can be re-launched from the water surface, which key innovation spurred the sport of kite boarding.

Subsequent innovations seek to improve on re-launching the kite from the water surface, such as, for example, U.S. Pat. No. 7,104,504 B2 by Peterson et al. which describes a system whereby the kite rider can use a dedicated line (or piggybacking onto one of the existing lines) to adjust the kite canopy profile to exhibit different aerodynamic characteristics to facilitate re-launching the kite.

FR 2,762,583 describes a mechanical system that allows the kite rider to partially de-power the kite by moving the control bar towards the kite, or by completely letting go of the control bar. Since the control bar is attached to the outside (steering) lines, this action changes the ratio of the outside steering lines (which lines are connected to the kite wingtips) to the inside (front) lines (which lines connect the kite's leading edge to the kite rider's harness), thus changing the kite shape and aerodynamic lift.

Subsequent innovations, for example, U.S. Pat. No. 6,830,220 B2 by Runyan disclose a quick release system whereby the kite rider can pull a lever at the control bar, which lever is connected to a wire, which wire pulls out two (or four) pins to disconnect the outside (steering) lines, or, in another embodiment, both the outside and inside lines. However, a potentially very dangerous scenario is created if the (inflated) kite lines and control are totally released, enabling the kite to fly freely. Although U.S. Pat. No. 6,830,220 B2 refers to the "deflation" of the kite when the disclosed release system is activated, this reference actually refers to de-powering the kite, as there is no reference, or mechanism, disclosed, that would or could de-pressurize and thus deflate the kite.

An additional prior art feature allows the kite rider to adjust the de-power range by pulling and locking a trim line connecting the center (inside) lines to the kite rider's harness. For example, Logosz in U.S. Pat. No. 7,621,485 B2 discloses a user adjustable trim line which the user can adjust and mechanically fix while flying the kite.

The prior art technology also allows the kite rider to disconnect from the inside lines by manually unhooking the inside lines, or by activating a release mechanism (see for example U.S. Pat. No. 6,988,694 by Bans, et. al. and U.S. Pat. No. 6,691,954 by Harrington, et al.). These maneuvers, combined with letting go of the control bar, causes the kite to partially de-power, by creating slack in two (or three) of the four (or five) lines while the kite rider still remains tethered to the kite by only one (or two) lines.

Once the kite rider disconnects from the inside lines, and lets go of the control bar, an (elastomeric) leash line connects the kite rider to one (or two) lines tethered to the kite. In this scenario, the kite is partially de-powered, and is still tethered to the kite rider.

For the scenario where the kite rider is still tethered to the kite by the two inside lines, the kite can still exert tension on these lines, especially if the wind velocity increases or the wind gusts.

To address the issue of enabling a kite rider to maximize de-powering a kite while tethered, U.S. Pat. No. 7,971,829 B2 by Dano See, et al. describes a kite de-powering system to provide additional de-power range by allowing only one of the center (inside) lines of a four line kite system to connect to the kite. An aspect of this invention is that this one-tether line design is configured to minimize the potential for tangles and twists.

In another variation of extending the de-power range of a kite, Logosz et al. in U.S. Pat. No. 7,581,701 B2 presents a pulley system that creates twice the relative change in length between the front lines and the steering lines, compared to the prior art, which, according to the authors, provides for a nearly complete de-powering of the kite while in flight.

In yet a further variation, Eberle, et al. in U.S. Pat. No. 7,810,759 B2 describe a kite line system containing a supplementary line that acts as a third front line while the kite is in flight. The authors claim that such a third front line acts to stabilize the geometry of the kite, acts as a depower line, and assists in re-launching the kite from the water surface. However, during a kite crash that rotates the kite through 360°, the use of a third front line will wrap around the kite, with the risk of cutting (and severing) the kite, and preventing the kite from being re-launched. For re-launch, the third front line needs to be disconnected, in-situ, by the kite rider.

However, even in the scenario where the kite is depowered using prior art methods, the kite retains its aerodynamic shape, and in windy or gusty conditions can suddenly fly off the water, or strongly move along the surface of the water, with considerable tension exerted on the lines. In this situation, standard practice is to have the kite rider slowly pull along towards the kite using one (or two lines), to retrieve the control bar, and then wrap the lines around the control bar such that only one line is taut between the control bar and the kite. This action allows the kite rider to slowly move along towards the kite, grasp the kite and then use the kite as a flotation device for a self-rescue, which self-rescue procedure is well known by those skilled in the art.

If such a self-rescue procedure is not possible due to, for example, a sudden (unmanageable) increase in wind velocity while on shore or in the water, during high wave conditions, harness bar failure, kite line failure, tangled lines, or being dragged towards rocks or towards the shoreline, it becomes prudent for the kite rider to completely disconnect from the kite.

Such total disconnection from the kite can be done by first letting go of the control bar, disconnecting from the inside lines, and then activating a leash release device (or manually detaching the leash line). This action causes the kite to freely stream away, with the control bar and kite lines still attached to the kite. Such a free-drifting kite can be dangerous to others in the water, or persons on shore, who may become caught or entangled in the kite lines or control bar being dragged uncontrollably behind the kite. In such a scenario, the kite's leading edge is still air-inflated, with the kite maintaining its aerodynamic shape, and able to power-up and create high tension in the lines if the kite or control bar become snagged.

If the kite rider becomes entangled in the lines, even disconnecting the leash release device may not allow the kite to totally release and disconnect. Some kite riders carry a knife to cut the lines during this potentially very dangerous scenario, which can be fatal.

Thus, a key safety issue in the sport of kite boarding is the danger of the kite rider being unable to sufficiently de-power the kite while being dragged along on the water, on shore, over rocks, entangled with the lines of another kite, or to disengage the kite completely in the scenario where the kite rider is entangled in the lines.

The current invention addresses the key safety issue of being able to sufficiently de-power an air-inflated kite by enabling the kite rider to quickly de-pressurize the kite's air-pressurized leading edge bladder, thereby causing the kite to lose its aerodynamic shape, and greatly restrict the kite's ability to catch wind and power-up.

That and other objects of the invention will be better understood by reference to the detailed description of the preferred embodiment which follows. Note that not all of the objects are necessarily met by all embodiments of the invention described below or by the invention defined by each of the claims.

SUMMARY OF THE INVENTION

The invention provides a safety system for use with kites in kite boarding on water, over snow or on land, to allow the kite rider to quickly and easily de-pressurize and deflate the kite's leading edge bladder totally or partially, thereby reducing the kite's aerodynamic shape and ability to power-up in the wind.

Such a kite de-powering system is accomplished by connecting a deflation control line to a valve on the kite's air-pressurized leading edge bladder at one end, and to a termination point near the user or rider, preferably within 3 meters of the harness.

Preferably, the valve is responsive to tension along the deflation control line such that tensioning the line causes the valve on the bladder to open, deflating the bladder and causing the kite to lose its aerodynamic shape. The deflation control line may be tensioned either by the user manually tugging on the deflation control line, or by releasing the tension on the other, normally tensioned, kite lines (such as by the user releasing the control bar and unhooking the chicken loop).

In an alternative embodiment, the deflation control line may comprise a pressure tube and a bulb is located on the pressure tube within reach of the rider. When the rider presses or squeezes the bulb, the increase in pressure acts to open the valve and to allow the bladder to deflate.

During normal use, the wing's leading edge bladder and struts are inflated to about 3-8 lbs. above atmospheric pressure. This provides sufficient rigidity to the kite's overall structure for use by the kite rider during kite boarding. For pressures in the kite bladder below about 1 lb., and especially below about 0.5 lbs. above atmospheric pressure, the kite's leading edge loses its rigidity, and its ability to form and hold an aerodynamic shape.

Activation of a deflation control line while the kite is flying will cause the kite's leading edge to lose its rigid aerodynamic foil structure and aerodynamic lift, fall from the sky and collapse into a loose pile of fabric. If the deflation control line is activated while the inflated kite is on the water or on the ground, it will also deflate and collapse. The deflation control line preferably only deflates the kite's leading edge bladder. The kite struts, which may consist of 1-5 struts, preferably remain inflated to provide for floatation for the kite and the kite rider.

There are various scenarios where the kite rider would wish to use the deflation control line. The deflation control line would be activated by kite rider when faced with a dangerous or difficult situation where simply de-powering the kite using the prior art de-power methods of setting the trim line to maximum de-power, pushing the control bar to maximum de-power, disconnecting the chicken loop from the harness hook, and letting go of the control bar, would provide insufficient loss of power from the kite. Such a situation can occur on land, while flying the kite in the air, or when the kite is floating on the water surface.

Self-launching a kite (without assistance from others) from the ground into the air can sometimes overpower the kite rider, with the kite knocking down and dragging the kite rider along the ground, or flying into nearby trees or other structures on shore. In such scenarios, the kite rider would quickly activate the deflation control line to de-pressurize and deflate the kite's leading edge, thereby massively de-powering the kite.

Similarly, when the kite rider returns to shore with no one on shore to catch the kite, and especially where the shore is rocky or has a difficult access, the kite rider can activate the deflation control line to de-power the kite to make a safe return to shore while still remaining attached to the now-deflated kite, but with the leash line in low tension. The kite rider can then detach from the leash to totally disconnect the kite.

In scenarios where the kite rider is overpowered or loses control of the kite on the water due to wind gusts, waves, entanglement in the lines of another kite rider, grounding on a shoal or sandbar, wrapping the lines around limbs, wrapping lines around the control bar or falls into the water, or losing his/her board while being dragged along on the water surface, the kite rider could quickly activate the deflation control line.

Additionally, it is much safer to approach and rescue a kite rider in the water attached to a deflated kite, than to rescue a kite rider attached to an inflated kite that risks suddenly powering up, with the kite lines entangling the kite rider or rescue personnel. Recovering a free-floating deflated kite would be easier and safer than recovering an inflated kite dragging lines and a control bar.

According to the preferred embodiment, the deflation control line is attached to the leash that is also securable to the rider's harness. Once the rider has released the control bar and has disengaged the chicken loop, the otherwise untensioned deflation control line becomes the only resistance to the power of the kite. This tensions the deflation control line against the leash and the harness, such tension acting to open the valve on the bladder.

In another embodiment, the leash remains connected to one of the inner tether lines as is typically done in the prior art, but a deflation control line is also attached to the leash. According to this embodiment, the deflation control line is of such a length that it remains slack and untensioned even when the chicken loop has been disengaged and the inner tether lines are connected only to the leash. The deflation control line then only comes into play to deflate the bladder if the rider additionally triggers a safety release to cause the deflation control line to tension by disengaging the inner tether line.

In another aspect of the invention, tensioning the deflation control line also acts to draw portions of the kite wing (the wing being the portion of the kite that engages the wind when inflated) in toward one another, thereby reducing the footprint of the wing. The deflation control line may include a length of line extending from a point (such as a ring) near the middle of the wing to opposite ends of the wing, such that pulling the deflation control line away from the wing pulls the wing tips in toward the middle thereby collapsing the wing. The smaller deflated-wing footprint reduces the wing's ability to flap and flutter about in the wind, which risks re-powering the kite, albeit to a minor extent. By reducing the footprint of the deflated wing in the water, it is also more convenient for the now-swimming kite rider to gather and control the wing for swimming to shore. According to an aspect of the invention, the length of line may also comprise uni-directional catches to prevent the collapsed wing from inadvertently unfurling, once pulled into a smaller footprint.

In one aspect the invention therefore comprises a kite de-powering system for a kite board system having a wing with an inflatable leading edge bladder to provide an aerodynamic shape to the wing when inflated, a control bar, a plurality of elongated outer steering lines and at least one elongated inner tether line for tensioned tethering of the wing to a harness to be worn by a user. The kite de-powering system comprises a valve for selectively releasing air from the bladder. A deflation control line is connectable to selectively open the valve and deflate the bladder. One end of the deflation control line terminates within three meters of the harness.

In a further aspect, the deflation control line is operative to open the valve and deflate the bladder when tension is exerted along the deflation control line.

In another aspect, said kite system further comprises a leash. One end of the leash is attachable to a harness. The leash is further connected to the deflation control line whereby to tension the deflation control line against the harness when the tether line is detached from the harness and the wing is under power.

In another aspect, the kite system further comprises a chicken loop for retaining the tether line to the harness and the deflation control line is disengageable from the harness.

In another aspect, the kite de-powering system further comprises an element on the deflation control line, such as a ring, a loop, a ball, a pull-tab or a grip, the element being adapted to be grasped and pulled by a user to manually tension the deflation control line so as to open the valve and deflate the bladder. Preferably the element is retained on at least one of the steering lines, the inner lines or the control bar.

According to one alternative aspect, the deflation control line comprises a pressure tube connecting the valve to a bulb that is located within three meters of the harness. The valve opens in response to the application of pressure on the bulb.

In a related but different aspect, at least one length of line is connected to the deflation control line. The length of line engages the wing at at least two points spaced from one another along the wing. Drawing the deflation control line away from the wing causes the points to draw toward one another to at least partially collapse the wing. The spaced points may be substantially located at opposed wing tips of the wing.

In another aspect, the deflation control line includes a branching into two segments extending in opposed directions along the leading edge of the wing through loops attached to the wing. The two segments terminate and are secured near opposed wing tips.

In another aspect, the deflation control line branches into two segments extending in opposed directions along the leading edge of the wing through loops attached to the wing and the deflation control line is detachably connected to the valve in the vicinity of the branch. A ring may be attached to the wing adjacent the valve to define the branch at the point where the deflation control line passes through the ring.

In another aspect, there are provided restraints along the length of line or along the wing whereby to prevent the points from extending away from one another once they have been drawn toward one another.

In a further aspect, catches are provided along the segments. The catches can pass through the loops in only one direction to prevent the wing from spontaneously re-powering.

In a further aspect, one end of the leash is attachable to the harness and another end of the leash is attachable to the deflation control line.

In another aspect, the leash may be attachable to both the deflation control line and to the tether line. In a subsidiary aspect, the deflation control line is longer than the tether line. Accordingly, when the tether line is tensioned against the leash, the deflation control line is substantially untensioned. In another approach, the tether line is attachable to the leash at a point that is distal from the harness and the deflation control line is attachable to the leash at a point that is proximal to the harness so that tensioning of the tether line against the leash leaves the deflation control line substantially untensioned.

In a further aspect, when the control bar is let go, a chicken loop is released and a push-release system for releasing the tether line is activated, the leash tensions the deflation control line causing the valve to open and to deflate the bladder.

In a further aspect of the invention an air containment bag is attached to the wing and an outlet of the valve is directed into the air containment bag. Preferably the air containment bag is rolled up and attached to the wing by means of a releasable restraint. The releasable restraint is released when the valve is opened. The air containment bag unfurls when receiving air.

In a use aspect, the invention comprises the use of a kite de-powering system as described earlier comprising obtaining a kite de-powering system as described above wherein air from a previously inflated bladder has been substantially expelled into the air containment bag, and exerting pressure on the air containment bag to return the air to the bladder, then closing the valve. In another aspect the air containment bag is rolled up to expel the air into the bladder. In a related aspect, the valve is a two-way valve selectable to allow air to flow in either direction.

The bladder of the invention may comprise at least two compartments that can be deflated separately.

In a method aspect, the invention comprises a method for a rider of a kite board to rapidly deflate an inflated leading edge bladder on a kite wing. The kite wing is tethered to a harness worn by the rider by means of at least one tether line. The kite wing is connected by outside steering lines to a control bar held by the rider. The method comprises causing a valve on the bladder to open and release air from the bladder. This may be caused by causing a deflation control line to undergo tension. The deflation control line may be attached to the valve and extending from the valve to the vicinity of the harness.

In a more particular aspect, the step of causing a deflation control line to undergo tension comprises releasing the control bar and relieving tension on the tether line. The latter function may be accomplished by disengaging a chicken loop that attaches the tether line to the harness.

After relieving tension on the tether line, the tether line may remain connected to a leash attached to the harness.

In another aspect, the tether line is disconnected from the harness such that tension that was along the tether line is taken up by the deflation control line. The deflation control line may be connected to the harness by a leash.

In a further method aspect, the leash is also then disengaged from the harness.

In an alternative method aspect, the step of causing a valve on the bladder to open comprises grasping and pulling the deflation control line.

In another aspect, the invention comprises a method for a rider of a kite board to rapidly depower a kite wing. The kite wing has an inflated leading edge bladder, it is tethered to a harness worn by the rider by means of at least one tether line and the kite wing is connected by outside steering lines to a control bar held by the. The method comprises the steps of releasing said control bar and disengaging a chicken loop connecting the tether line to the harness whereby to cause the wing to tension a deflation control line secured to the harness and attached to a valve on the bladder, causing the valve to open and allowing the bladder to deflate.

In another aspect, the tensioning of the deflation control line acts to draw spaced points of the wing toward one another so as to at least partially collapse the wing.

In another aspect, the bladder expels air into a containment bag attached to the wing. In a related aspect, the bladder is at least partially reinflated by applying pressure to the containment bag which is in fluid communication with the inflatable leading edge bladder of the kite wing.

In another aspect, the invention is a method for a rider of a kite board to de-power a kite wing while riding the kite board under power. The kite wing has an inflated leading edge bladder, the kite wing being tethered to a harness worn by the rider by means of at least one tether line and the kite wing is connected by outside steering lines to a control bar held by the rider. The method comprises releasing the control bar and disengaging a chicken loop connecting the tether line to the harness. This causes the deflation control line connecting two points spaced apart on the wing to draw together so as to at least partially collapse the wing.

In a related aspect, the invention comprises a kite board system having a kite wing with an inflatable leading edge bladder to provide an aerodynamic shape to the wing when inflated, a control bar, a plurality of elongated outer steering lines and at least one elongated inner tether line for tensioned tethering of said kite to a harness to be worn by a user. A control line is connectable to selectively collapse the kite wing. One end of the control line terminates within three meters of the harness and the other end of the control line comprises at least one length of line engaging the wing at at least two points spaced from one another along the wing. Drawing the control line away from the wing causes the points to draw toward one another so as to at least partially collapse the wing.

Preferably, the control line branches into two segments extending in opposed directions along the leading edge of the wing through loops attached to the wing. A ring may be attached to the wing with the control line passing through the ring and from which the control line branches.

In another aspect, restraints are provided along the length of line or along the wing so as to prevent the points from extending away from one another once they have been drawn toward one another. This may comprise catches along the segments whereby to allow the catches to pass through the loops in only one direction to prevent the wing from spontaneously re-powering.

Preferably the spaced points that act to draw the kite wing in upon itself are located substantially at opposed wing tips.

In a further aspect, one end of the control line is connected to the harness. When the kite wing is under power and the tether line is untensioned, the control line tensions to draw the points toward one another tending to collapse the wing.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

DETAILED DESCRIPTION OF THE PREFERRED AND OTHER EMBODIMENTS

Figure 1:
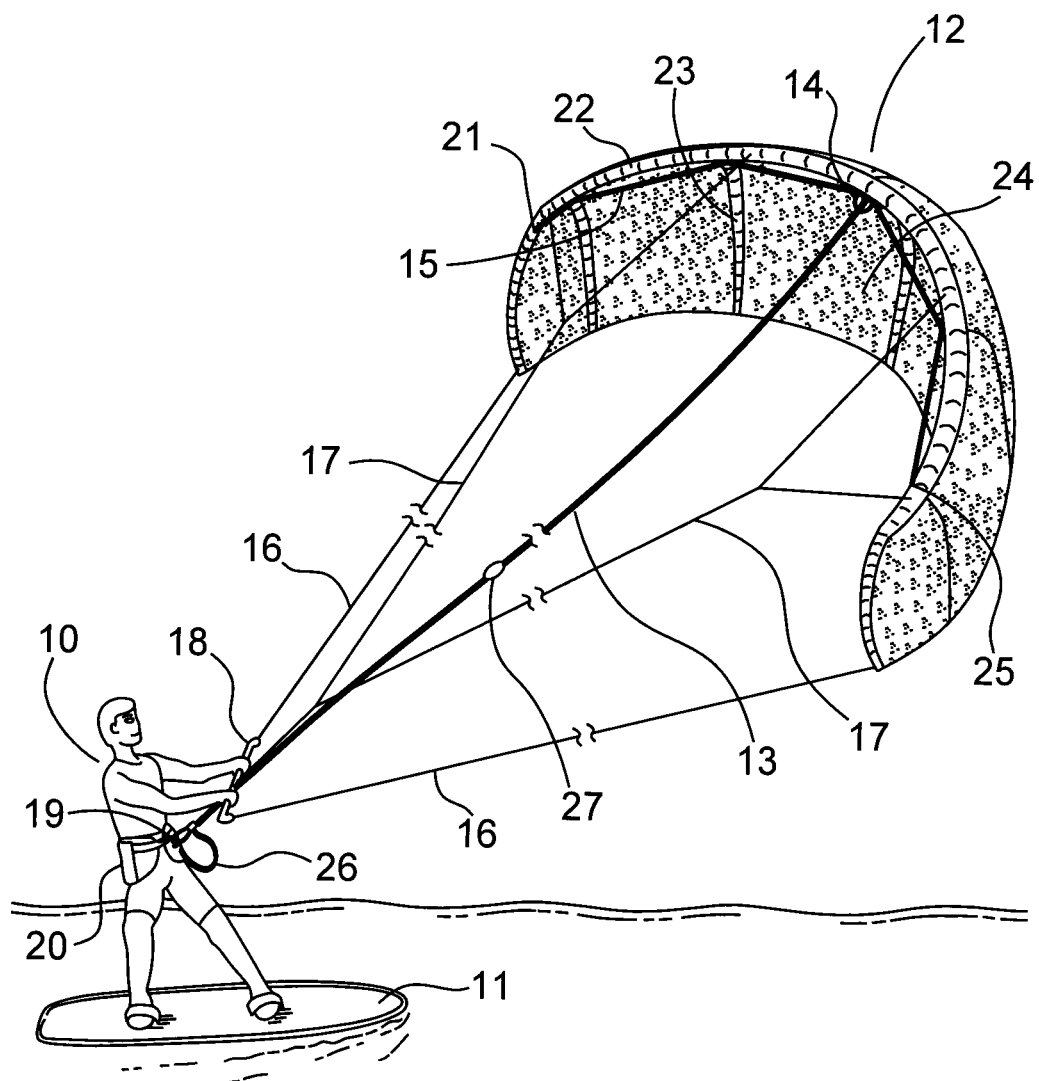
FIG. 1 depicts a kite rider standing on a kite board holding a kite, including a deflation control line according to the preferred embodiment of the invention.

FIG. 1 is a sketch of the preferred embodiment with the kite rider 10 standing on a kite board 11 holding a kite 12, with the deflation control line 13 threaded through a hole in control bar 18 and connected to leash 26, one end of which is connected to the kite rider's harness 20.

The other end of deflation control line 13 branches into two lines 15 at ring 14 (see FIG. 3), with each of these lines 15 connecting to the wing's opposed tips at points 21 and 25. Lines 15 are also engaged to the wing by being threaded through a number of loop attachment points positioned along the wing's leading edge, for example by loops 34 (see FIG. 4).

The wing's leading edge bladder is depicted as 22 in FIG. 1. Bladder 22 is comprised of an elastomeric material, which is housed in an abrasion resistant cloth covering, such as Dacron polyester. For convenience, the bladder and bladder covering are both depicted as 22.

In many prior art applications, the leading edge bladder comprises a single compartment. However, for redundancy and performance reasons, it can be advantageous for the leading edge bladder to include two or more compartments. Such separate compartments can be inflated to the same or different pressures, and can be deflated separately or all at once.

Struts 23, which are also air-inflated, provide support for the kite canopy 24, which struts preferably do not depressurize when deflation control line 13 is activated. Struts 23 provide for flotation for the kite rider, especially during self-rescue when the kite's leading edge bladder is partially or totally deflated.

As is known, outside (steering) lines 16 are connected to control bar 18 at the kite rider end, with the inside (front) tether lines 17 connected to a so-called "chicken loop" (shown as 41 in FIG. 9) which chicken loop is attached to hook 19 on the harness 20.

Deflation control line 13 connects to an air-release valve (shown in FIG. 3 as 29) near ring 14. The air-release valve connects to the leading edge bladder, which valve opens when deflation control line 13 is tensioned.

Figure 2:
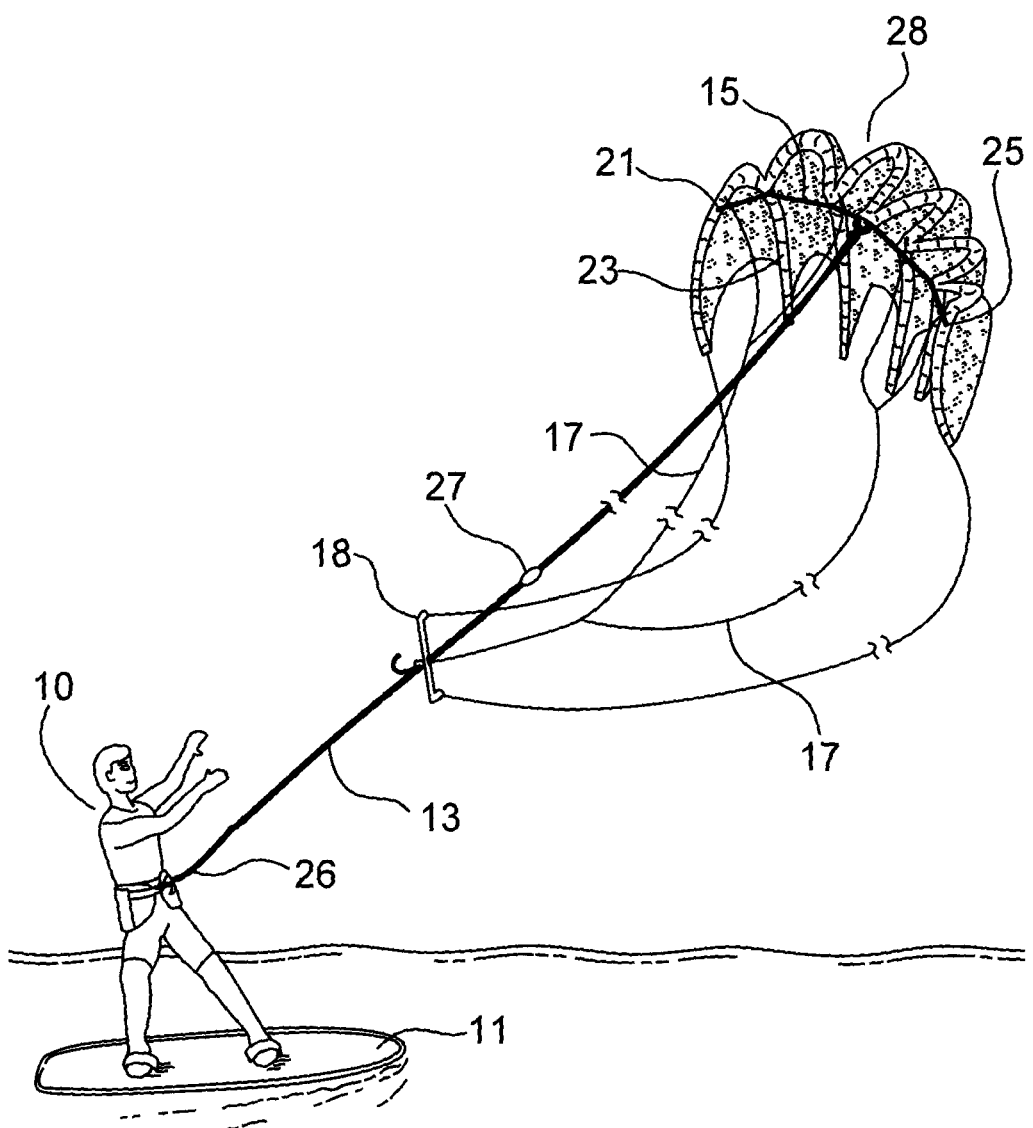
FIG. 2 illustrates a kite rider standing on a kite board, with the center lines unhooked and the control bar released, with the kite deflating and collapsing.

To activate the system of the preferred embodiment, the kite rider lets go of control bar 18, which control bar is restricted from moving past stopper 27. This releases the tension in steering lines 16 which terminate on the control bar 18. At this point, the rider remains tethered to the inner tether lines 17 through the harness 20 and the chicken loop 41. If still in distress, the rider may then disconnect the chicken loop 41 from the hook on harness 20 either by manually unhooking the chicken loop or by pushing on a quick-release mechanism securing the leash to the inner tether line (not shown but known to those skilled in the art). The foregoing actions cause deflation control line 13 to become the only line tethering the rider to the kite as illustrated in FIG. 2. As deflation control line 13 tensions, it causes the bladder air-release valve (shown in FIG. 3 as 29) to open and to deflate the bladder 22. The wing falls from the sky (if flying) and de-powers by losing its aerodynamic shape. Preferably, struts 23 remain inflated to provide flotation for the deflated kite.

Deflation control line 13 is preferably comprised of the same line material as used by prior art kite lines, which lines are generally made from braided polyethylene fibers, sold under the SPECTRA or DYNEEMA trademark, with an overall diameter of about 1.5 mm and a breaking strength of about 400 lbs.

Lines having any cross-sectional shape can be used, preferably having a round cross-sectional shape, preferably having a diameter of 1-3 mm, preferably having a breaking strength of greater than 100 lbs. and preferably having a density of less than 1 g/cc (for buoyancy in water).

Figure 3:
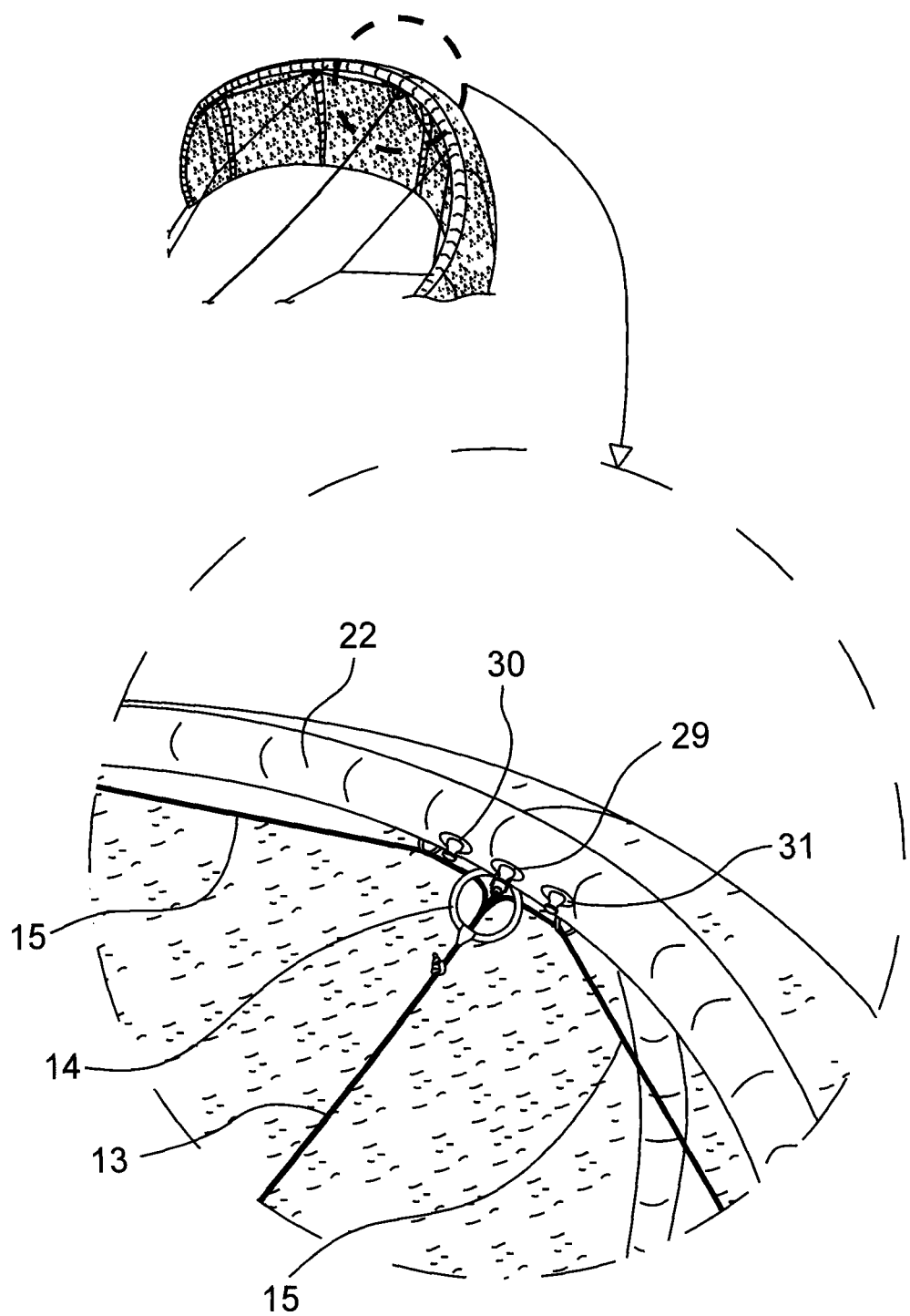
FIG. 3 is a close up view of the deflation control line connected to the kite bladder air-valve.

FIG. 3 illustrates the connection of the deflation control line to the valve and the branching of the deflation control line in segments 15. Deflation control line 13 includes a short length of line 32 (best seen in FIG. 4) that connects to valve 29 on bladder 22. Valve 29 is preferably comprised of an opening that is sealed with a plug (see 37, FIG. 4). In the drawings, air valves 30 and 31 represent the prior art air inflation and air deflation valves, respectively, which may be provided on the wing in addition to valve 29 according to the invention. Tension on deflation control line 13 pulls on valve 29 thereby opening it. Preferably this consists of removing plug 37, allowing air to escape bladder 22.

Figure 6:
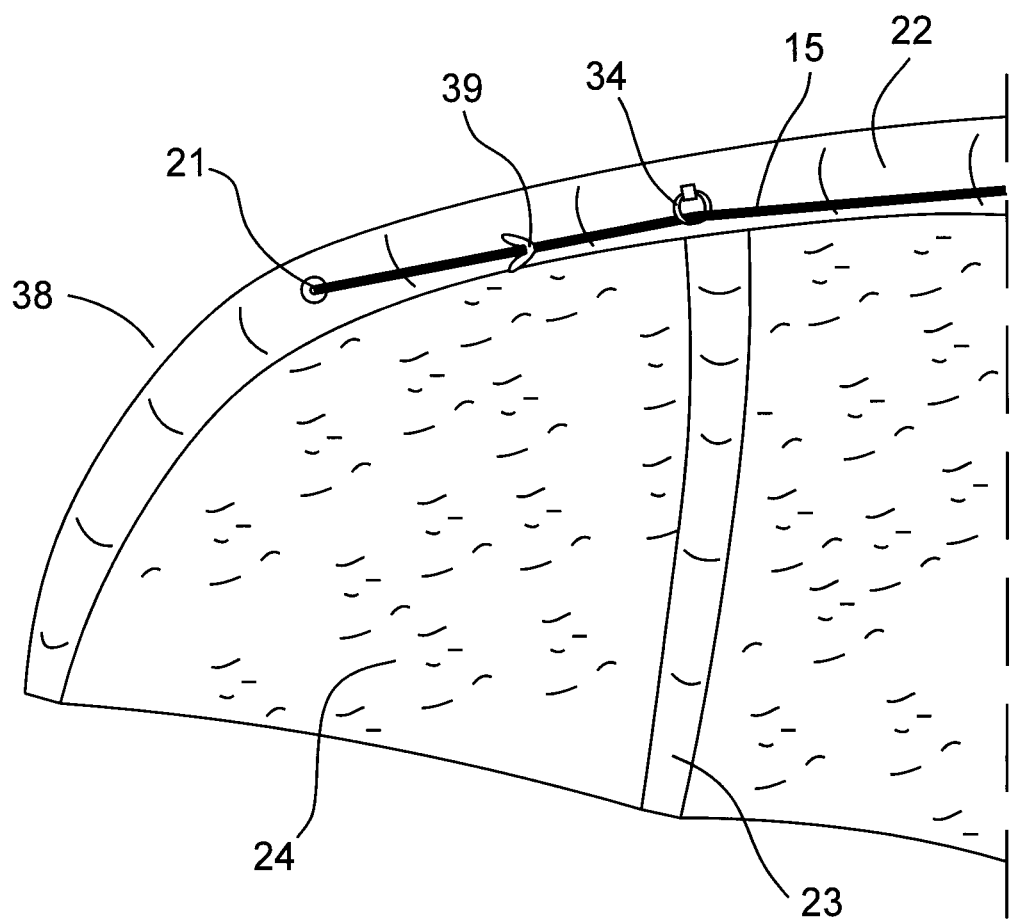
FIG. 6 shows one edge of the kite with the deflation control line segments held to the kite by loops and terminated near the kite wingtip.

In another aspect of the invention, tension on deflation control line 13, which urges the line 13 away from the wing, also draws the wing tips in toward one another. The wing's surface area footprint is reduced, impairing the wing's ability to flap and flutter in the wind. Deflation control line 13 is threaded through ring 14 where it branches to line segments 15, which collectively form a length of line across the wing's leading edge. Segments 15 are threaded through loops or rings 34 (see FIGS. 4 and 6) and terminate at or near wing tips 21, 25. Ring 14 provides a point of common connection for deflation control line 13, lines 15 and the short length of line 32 that connects to air valve 29.

Figure 4:
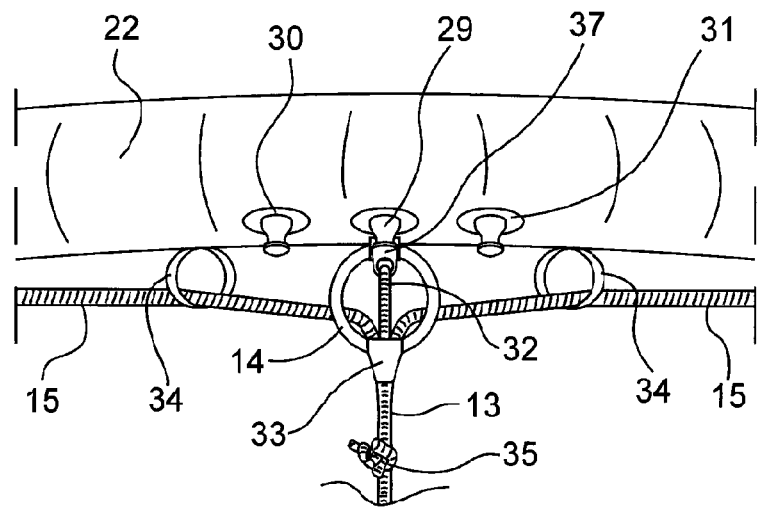
FIG. 4 is a further view of the deflation control line connected to the kite bladder air-valve.

Referring to FIG. 4, deflation control line 13 is connected to valve 29 on bladder 22. Line 13 divides at ring 14 into lines 15 with short line 32 connecting to air-release valve 29. Ring 14 is attached to leading edge 22. Air-release valve 29 is sealed air-tight by plug 37. Lines 15, line 32 and line 13 connect at a common point 33, which point 33 is held to ring 14, preferably by a hook and loop fastening strip such as Velcro. When deflation control line 13 is tensioned, the strip holding point 33 to ring 14 is released, with line 32 pulling plug 37 and opening air-release valve 29 (see FIG. 5), allowing pressurized air from bladder 22 to vent into the atmosphere. Also, at the same time as line 13 is tensioned, lines 15, which are secured to the leading edge material of the wing by loops 34, tension, pulling the wing's leading edge into a smaller footprint. Connection 35 is adapted for a quick connect-disconnect of line 13 from plug 37 and lines 15, for convenient kite packing and transport.

Figure 5:
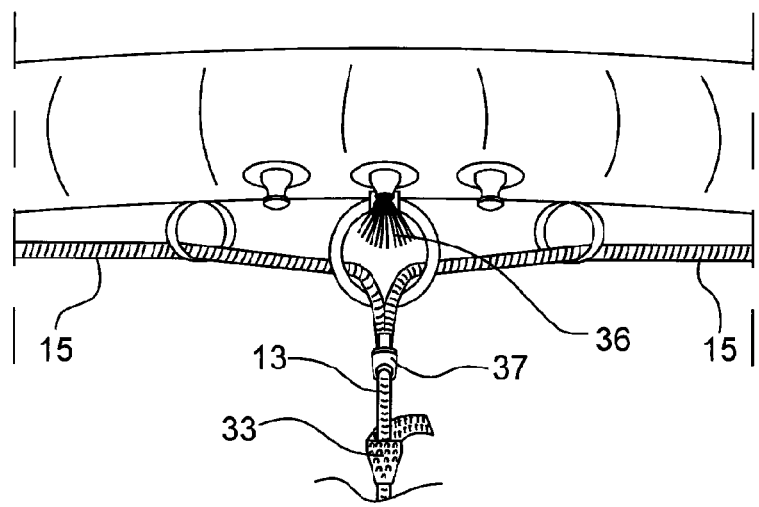
FIG. 5 is a view of the deflation control line that has been tensioned and pulled to open the kite bladder air-valve.

FIG. 5 shows the preferred embodiment of FIG. 4 wherein valve 29 has been opened by tension in line 32, with bladder 22 de-pressuring, and air escaping from valve 29 (with the escaping air depicted as 36). Lines 15 act, under tension, to pull bladder 22 into a smaller footprint.

Figure 4A:
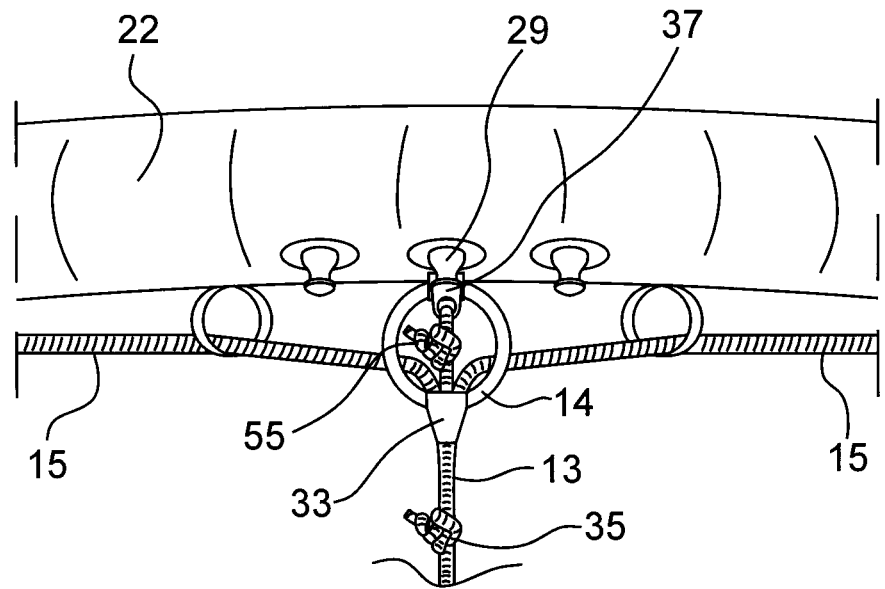
FIG. 4A is a view of FIG. 4 showing a mechanism for detaching the deflation control line connecting to the kite bladder air-valve.
Figure 4B:
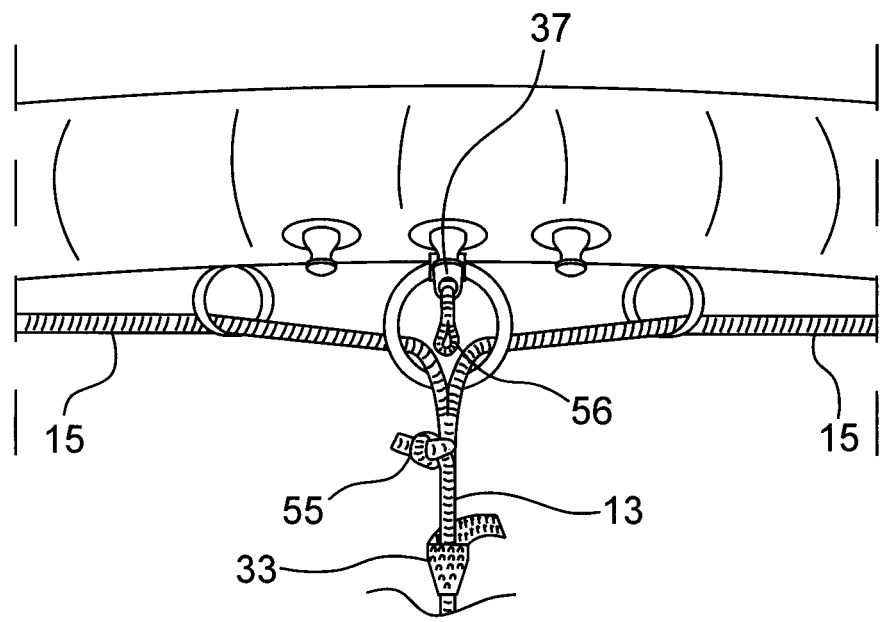
FIG. 4B is a view of FIG. 4A where the mechanism for detaching the deflation control line connecting to the kite bladder air-valve has been detached.

To provide the kite rider with the option of disengaging the deflation control line connecting to the valve, connection 55 (shown in FIG. 4A) is adapted for a quick disconnect from loop 56 (best seen in FIG. 4B). This disconnection can be manually done by the user prior to launching the kite. FIG. 4B illustrates line 13 disconnected from loop 56 (and hence line 32). In this scenario, bladder 22 will not deflate if line 13 goes into tension. However, if line 13 does tension, lines 15 will also tension, still causing wingtips 21 and 25 to pull the wing into a smaller footprint and distorting the aerodynamic shape of the wing. Such action will tend to de-power the kite, though to a lesser extent than if the bladder 22 were deflated.

Figure 7:
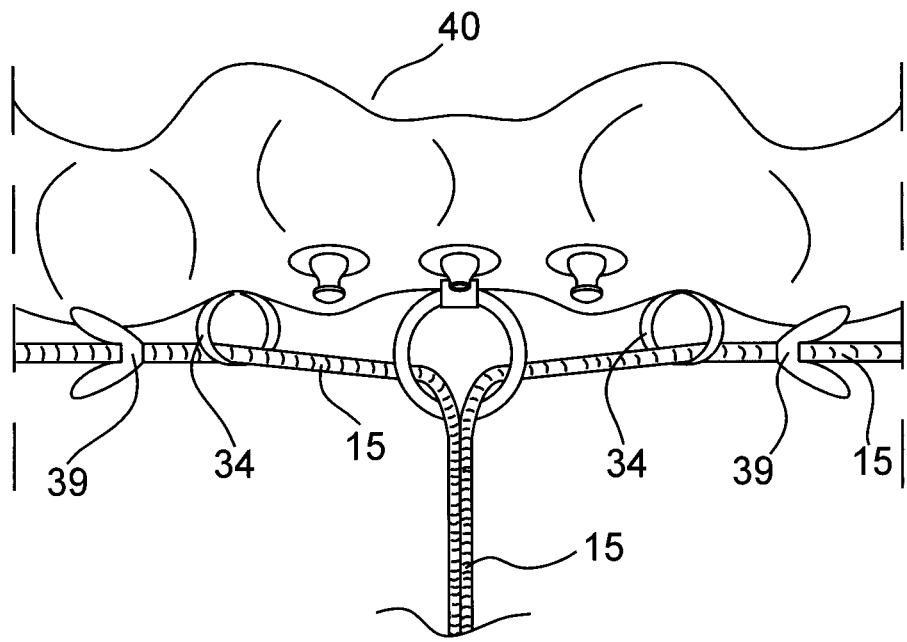
FIG. 7 shows the kite bladder air-valve opened and the kite deflating.

To ensure that line segment 15 remain taught to hold the wing in a smaller footprint, it is preferable to use catches on lines 15, as illustrated in FIG. 7 by 39, allowing the catches to travel through the loops 34 in one direction but loops 34 acting to restrain the catches against travel through the loops in the opposite direction.

Figure 8:
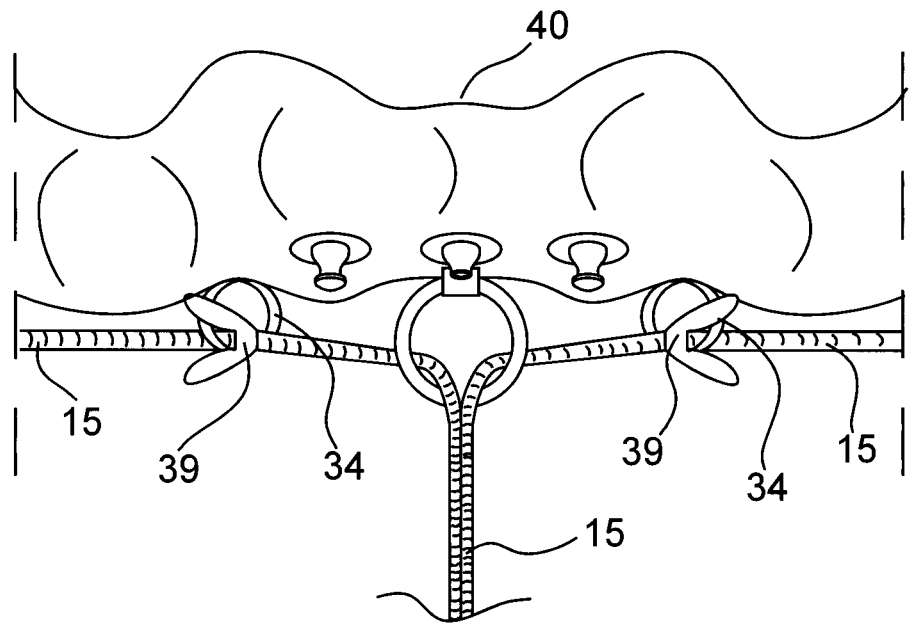
FIG. 8 shows one-way catches on the deflation control line segments pulled through retainer loops.

Line 15 is held in engagement with the leading edge of the kite by loops 34, and terminates at wingtip 21. As seen in FIGS. 7 and 8, catches 39 on line 15 serve to hold the collapsed kite in a collapsed state once catches 39 have been pulled through loop 34. Catches 39 are preferably made from a plastic material and are configured with rounded edges so as to not puncture the kite. In one embodiment, the catches 39 may comprise a deformable cone.

FIGS. 7 and 8 show the bladder 22 deflated, with catches 39 being pulled through loops 34, thereby holding the kite in a smaller footprint, as the catches 39 hold lines 15 between the loops 34 and the attachment of lines 15 at the wingtips.

Figure 9:
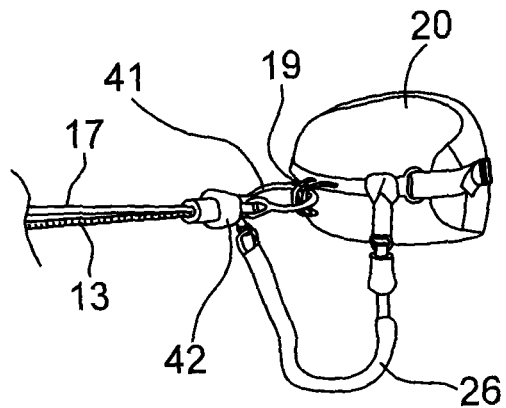
FIG. 9 depicts the kite lines and the chicken loop connected to the harness hook, with the leash connecting the deflation control line to the harness.
Figure 10:
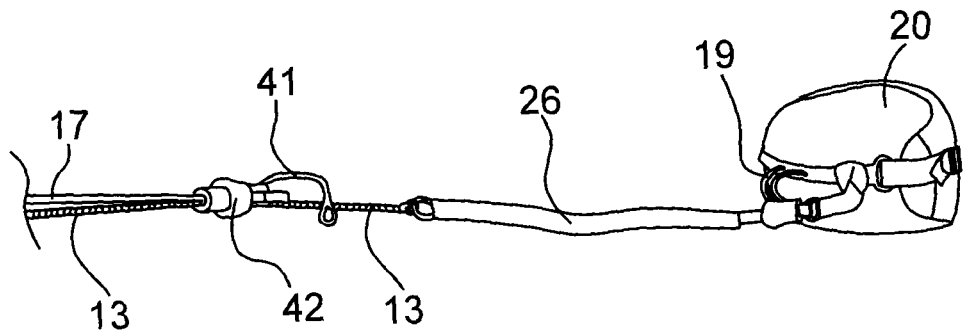
FIG. 10 depicts the kite lines and chicken loop disconnected from the harness hook, with the leash (now in tension) still connecting the deflation control line to the harness.
Figure 11:
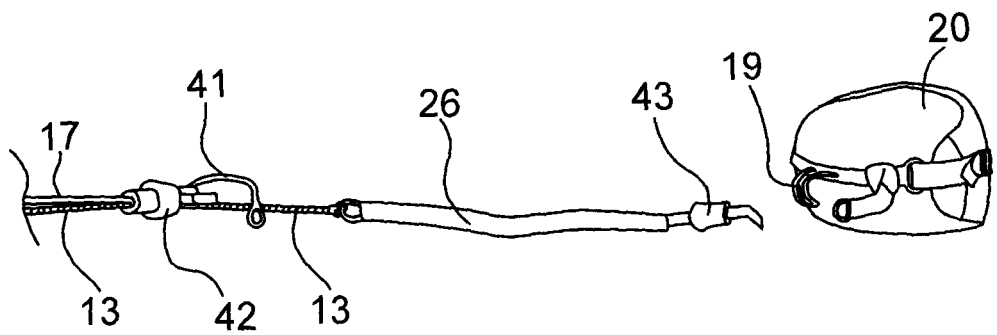
FIG. 11 depicts the kite lines and chicken loop disconnected from the harness hook, with the leash and deflation control line now also disconnected from the harness.
Figure 12:
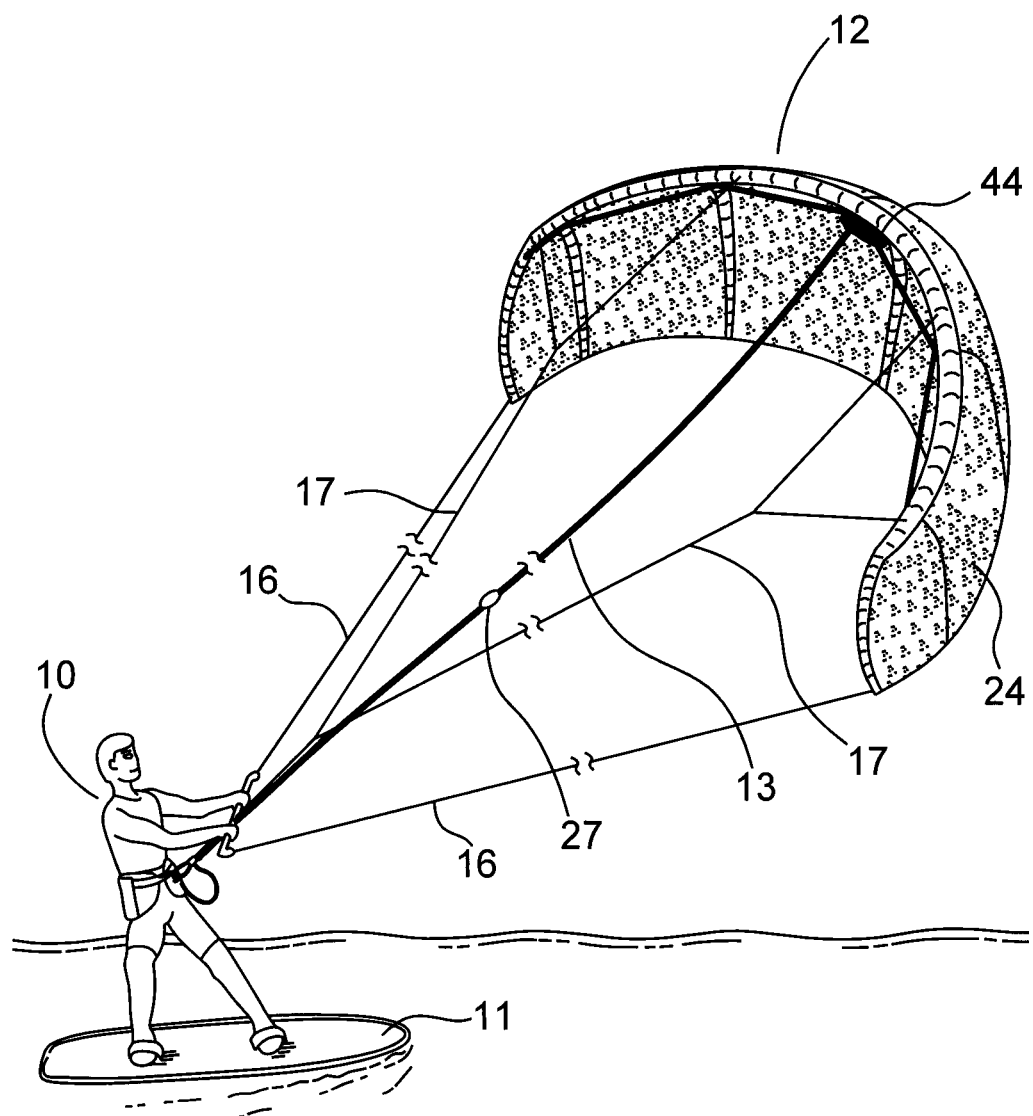
FIG. 12 shows an alternate embodiment with a lightweight air transfer bag rolled-up under the leading edge of the kite.
Figure 13:
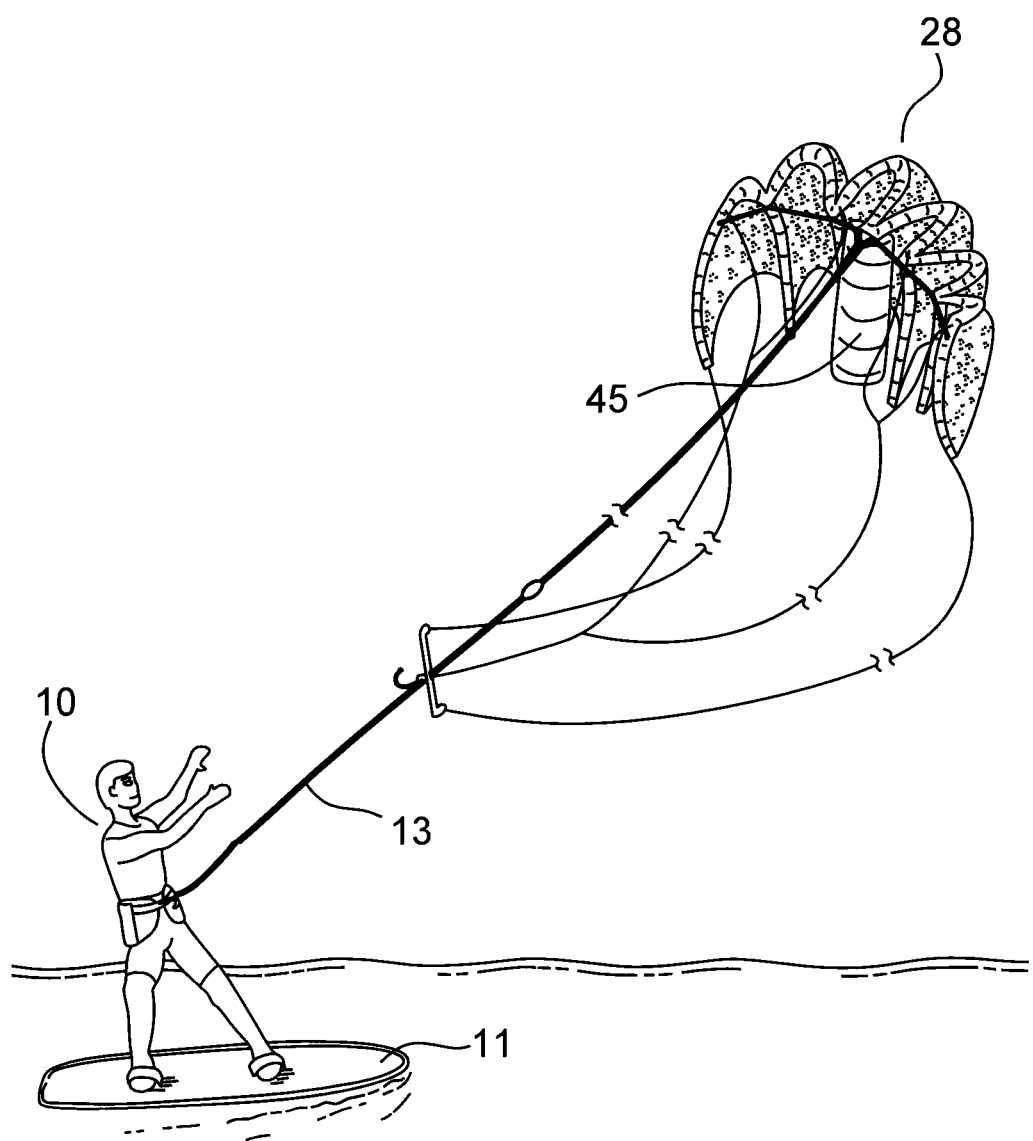
FIG. 13 is similar to FIG. 2, with the center lines unhooked and the control bar released, with the kite deflating and collapsing, but with the air from the kite's bladder now being released into an air transfer bag instead of being vented into the atmosphere.

FIGS. 9-11 provide a close up view of the line attachments at the harness end. In these views, the control bar 18 has been omitted. Referring to FIG. 9, a "chicken loop" 41 is connected to harness hook 19. Chicken loop 41 is integrated into "push-out" release mechanism 42, as is known in the prior art. Leash 26 is connected at one end to harness 20 and at the other end to the end of the deflation control line 13.

FIG. 10 shows the preferred embodiment wherein the chicken loop 41 has been disengaged from the harness hook 19, which action occurs when the kite rider pushes on "push-out" release 42. In FIG. 10, there is also shown the tensioning of the deflation control line 13 against the leash 26 and the harness 20 causing the leash 26 to extend. As the tension on deflation control line 13 increases, the valve (not shown in FIGS. 9-11) is opened to deflate the bladder. Although deflation control line 13 could be attached directly to harness 20 (without leash 26), such design would not provide the kite rider with a mechanism to absorb shock loading on line 13 due to sudden wind gusts or wave action.

In FIG. 11, the rider has activated a second quick push-release system 43 to disconnect the leash 26 (and its attached deflation control line 13) from the harness 20.

In a different manner of use of the preferred embodiment, the kite rider can directly deflate the kite's bladder 22 in a single step by simply manually pulling directly on deflation control line 13, rather than by disengaging the chicken loop to release the tether lines. This action similarly causes valve 29 on the kite's bladder to open, thereby allowing pressurized air in the kite's bladder 22 to vent into the atmosphere.

Figure 22:
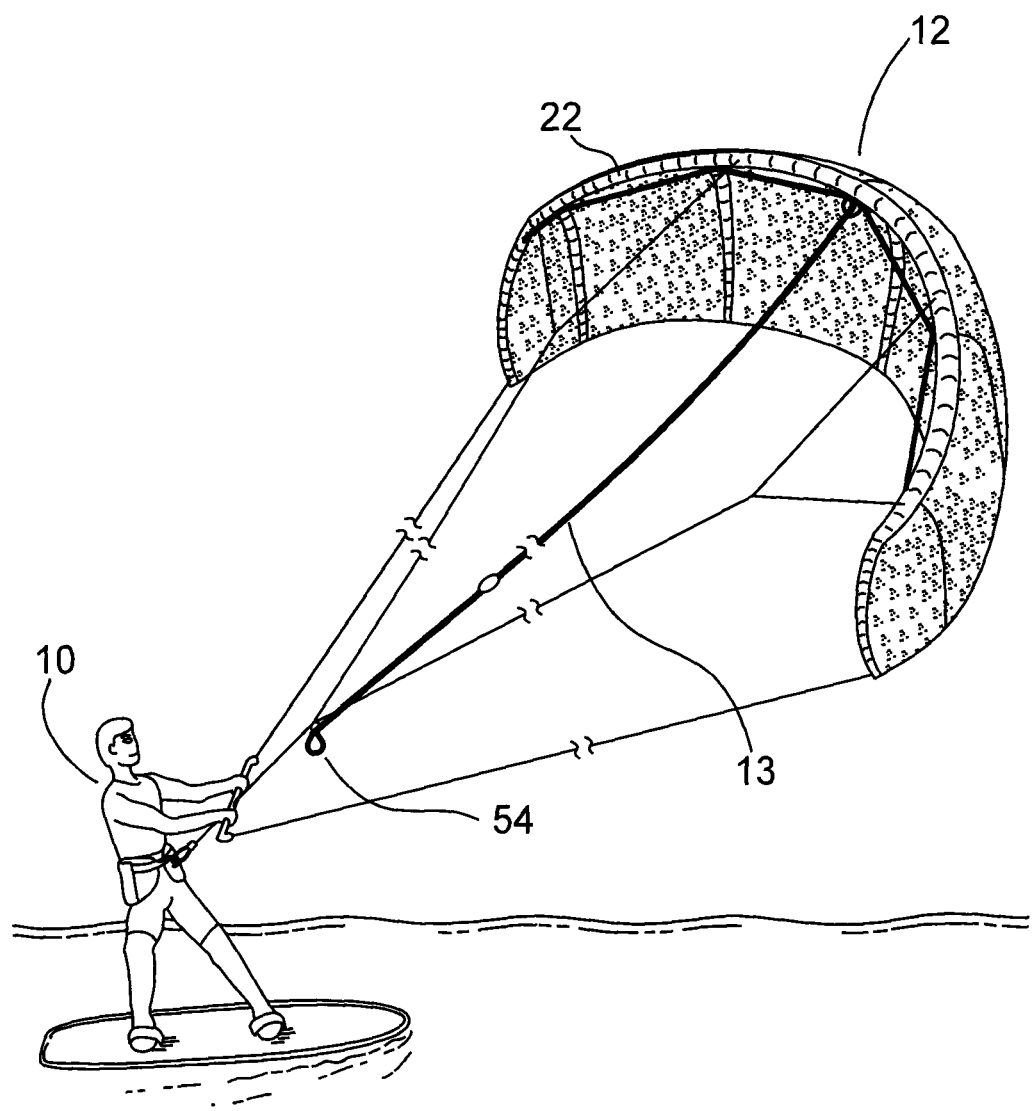

FIG. 22 illustrates an alternative embodiment designed to implement full direct manual actuation of the deflation control line. According to such embodiment, deflation control line 13 may terminate within about 3 meters of the harness and be provided with a grasping element 54 such as a ring, ball, loop, pull-tab or grip, to allow the rider to conveniently reach, and grab, such line termination in order to deflate the wing. For convenience, the grasping element can be held in position (for example by a hook or other attachment) along lines 16, 17 and or on control bar 20. According to this embodiment, the deflation control line is not attached to a leash or to the harness.

Figure 18:
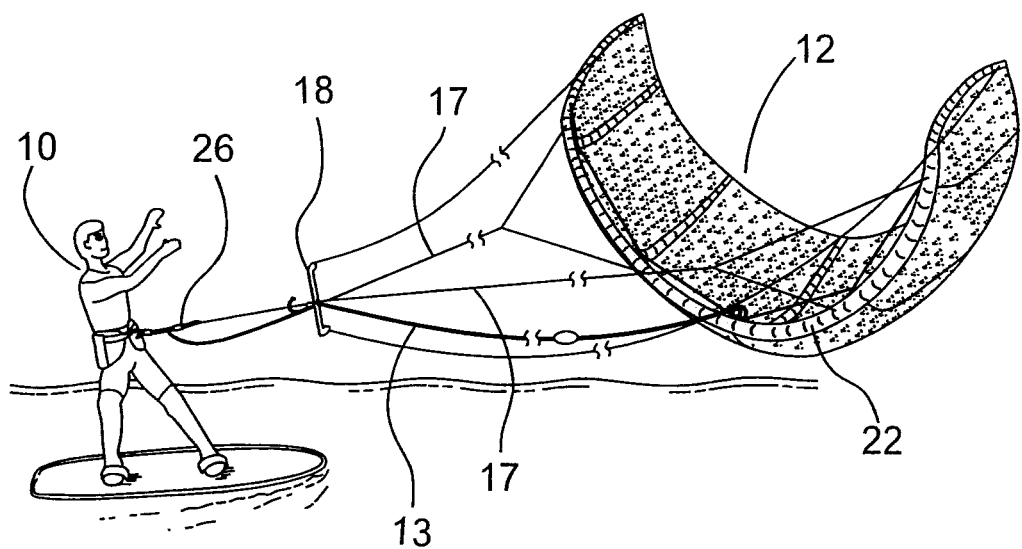
FIG. 18 illustrates a kite rider having released the control bar and chicken loop, with the center lines in tension, and the deflation control line slack.
Figure 19:
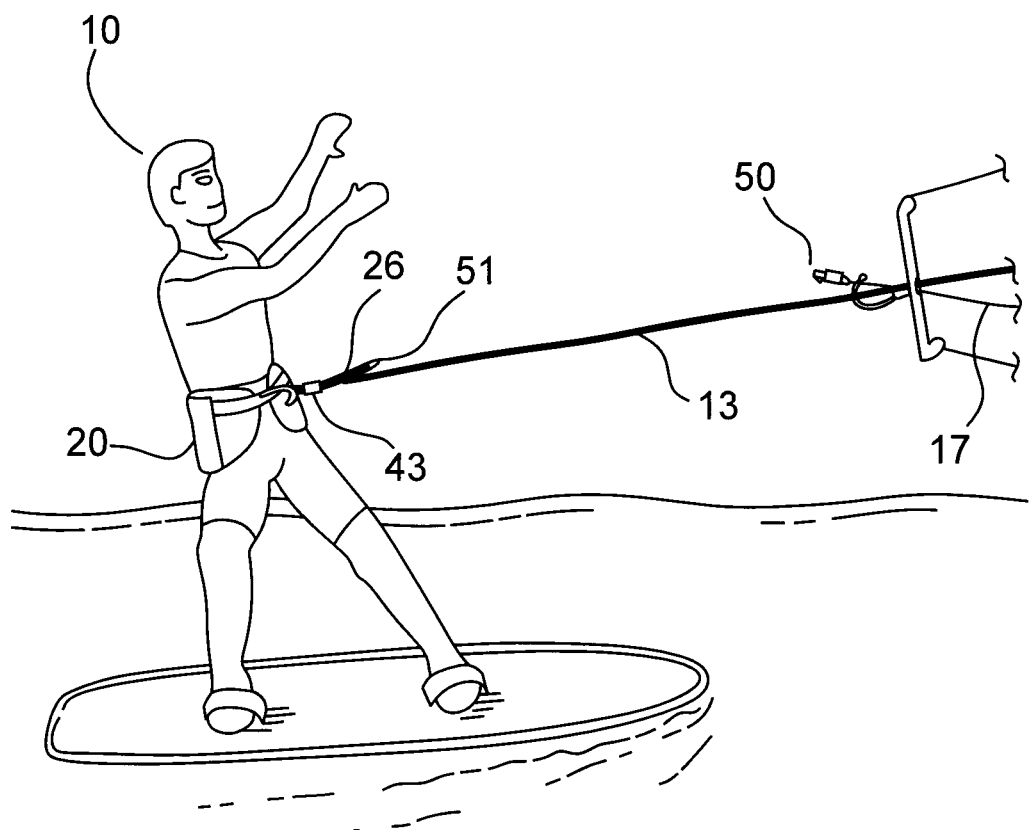
FIG. 19 is an enlarged view of a portion of FIG. 20, with the kite rider having activated a mechanism to cause the deflation control line to go into tension, and the center lines to go slack.
Figure 20:
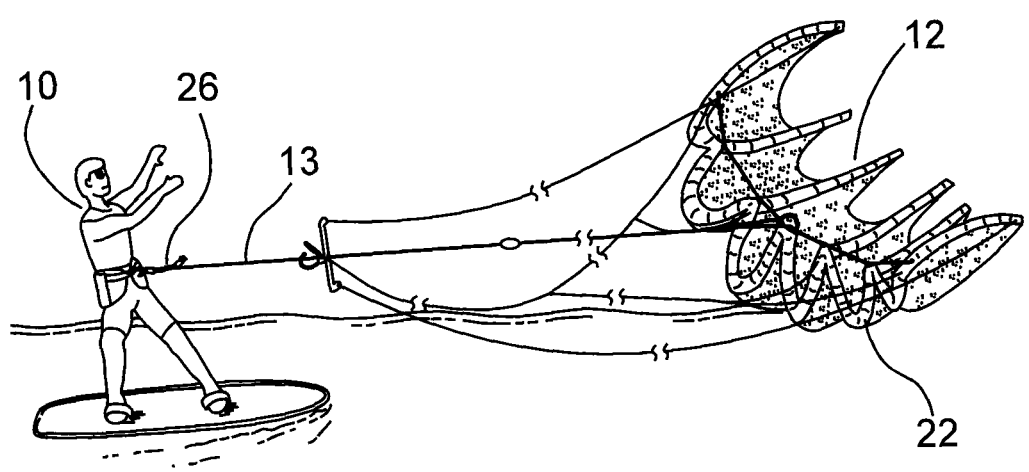
FIG. 20 shows the bladder deflating and the kite collapsing.

According to another alternative embodiment illustrated in FIGS. 18 and 19, leash 26 is connectable to at least one of the inner tether lines 17 as is typically done in the prior art, but a deflation control line 13 is also attached to the leash 26. FIG. 18 shows a kite rider 10 who has released the control bar 18 and has disengaged the chicken loop (just visible under the control bar 18). However, as leash 26 is attached to inner tether line 17, the kite is still attached to the harness 20 and the kite may be sufficiently depowered to satisfy the rider. As will be appreciated by reference to FIG. 18, the length of the deflation control line 13 from the wing to its point of connection to the leash is greater than the length of the extended inner tether line 17 from the wing to the same point of attachment of the deflation control line 13 to the leash 26. This allows the deflation control line 13 to remain slack and untensioned despite the inner tether line 17 being tensioned against leash 26.

By reference to FIG. 18, the kite rider may elect to retrieve the control bar, and re-connect to the chicken loop, without deflating the kite's bladder. However, if the rider requires further de-powering of the wing, a release mechanism 50 is activated manually to disconnect the inner tether line 17 from the leash 26 as shown in FIG. 19. This then tensions the deflation control line 13 against the leash 26 and the harness 20 to open the bladder valve and deflate the wing. A further safety release (shown as 43 in FIG. 19) allows the kite rider to totally disconnect from deflation control line 13, thereby allowing the kite to freely stream away.

In other embodiments, an air-valve system located on the kite's leading edge can be adapted to be remotely activated and opened by the kite rider operating a body-worn device, where the air-valve activation signal comprises an encoded acoustic, radio frequency or light signal. Such a remotely activated air-valve system (mounted at the kite end) would require electrical power to operate.

The foregoing embodiments may benefit from an added feature as illustrated in FIGS. 12 to 17.

Figure 14:
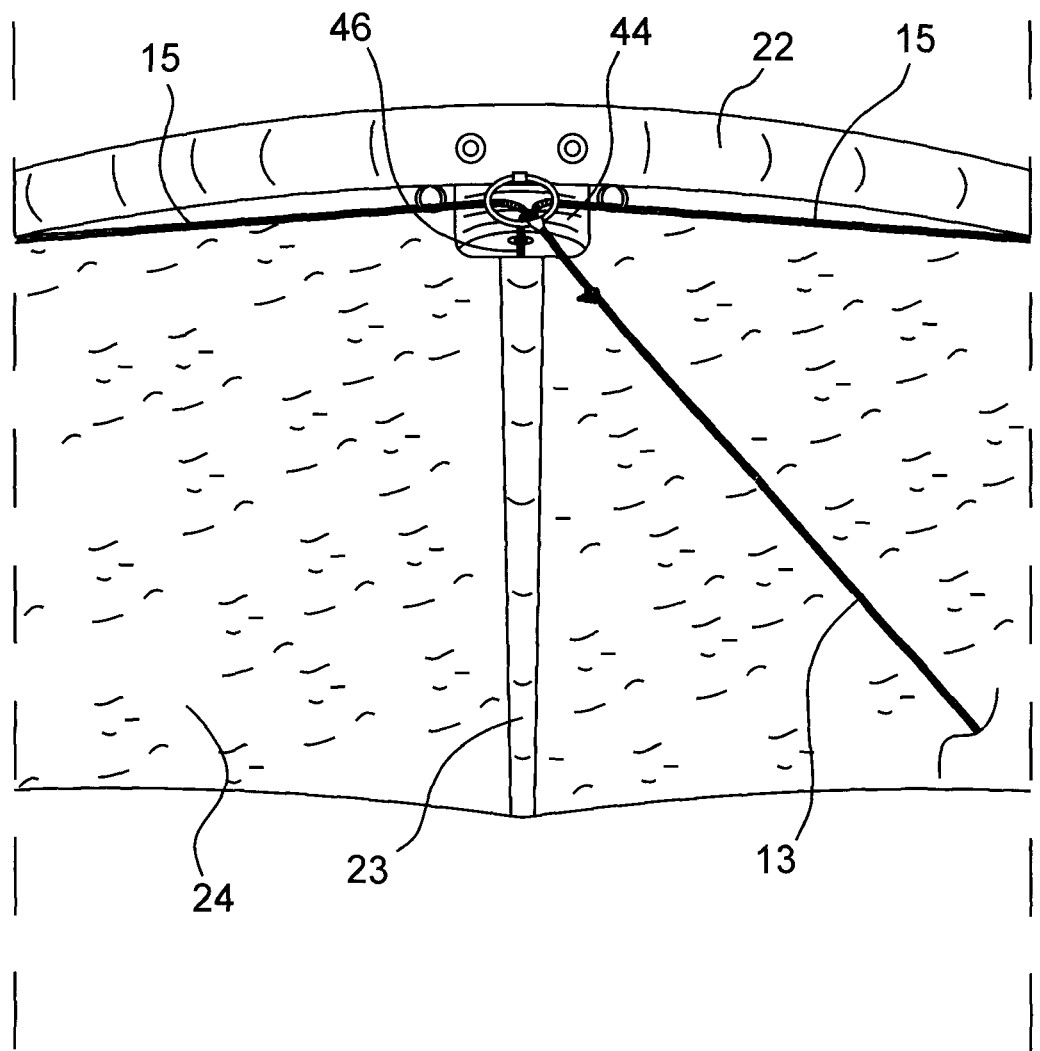
FIG. 14 is a sketch of the kite's leading edge, showing the rolled-up air transfer bag (contained within a containment bag)
Figure 15:
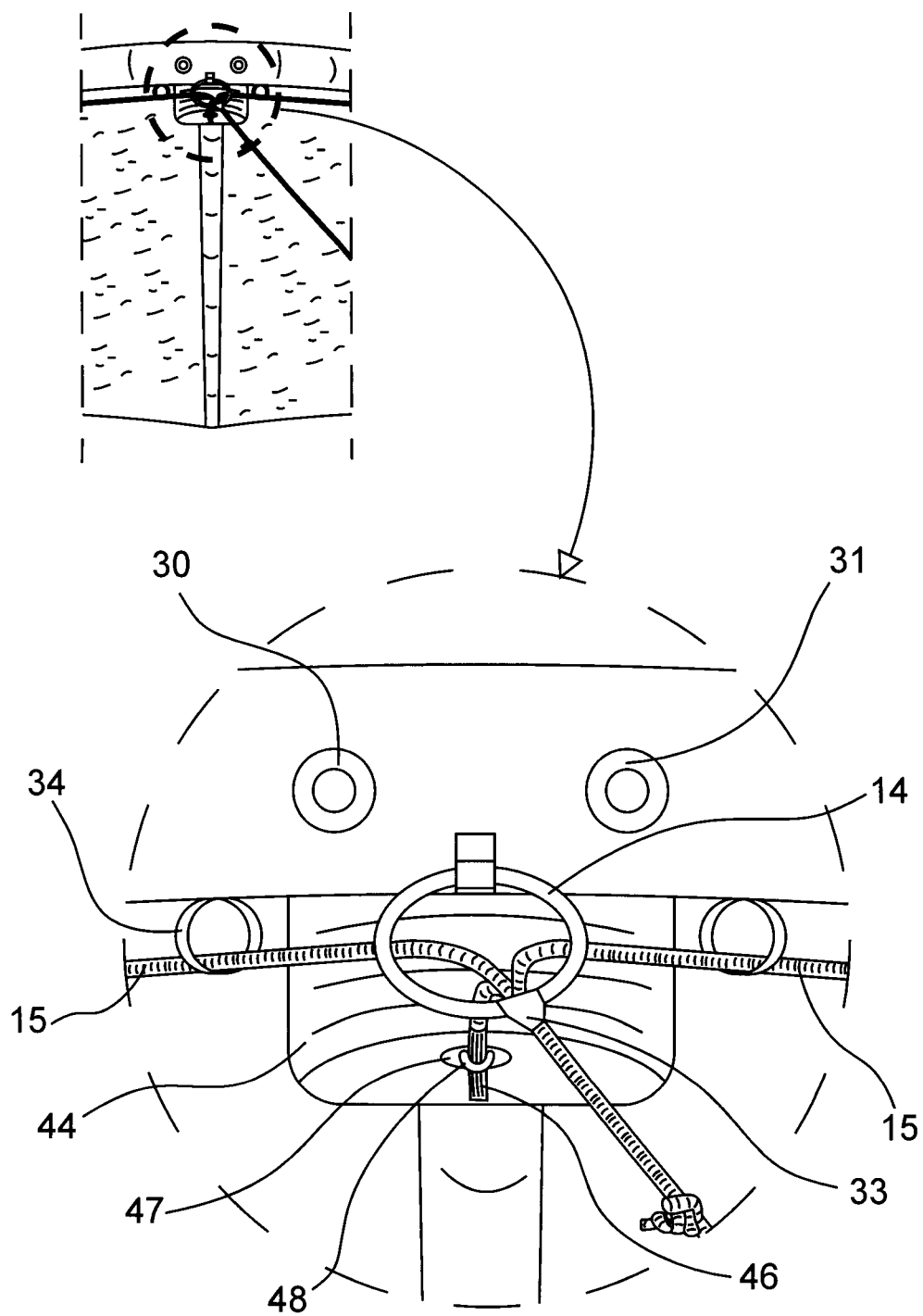
FIG. 15 is an enlarged view taken from FIG. 14, illustrating one method of containing the rolled-up air transfer bag.
Figure 16:
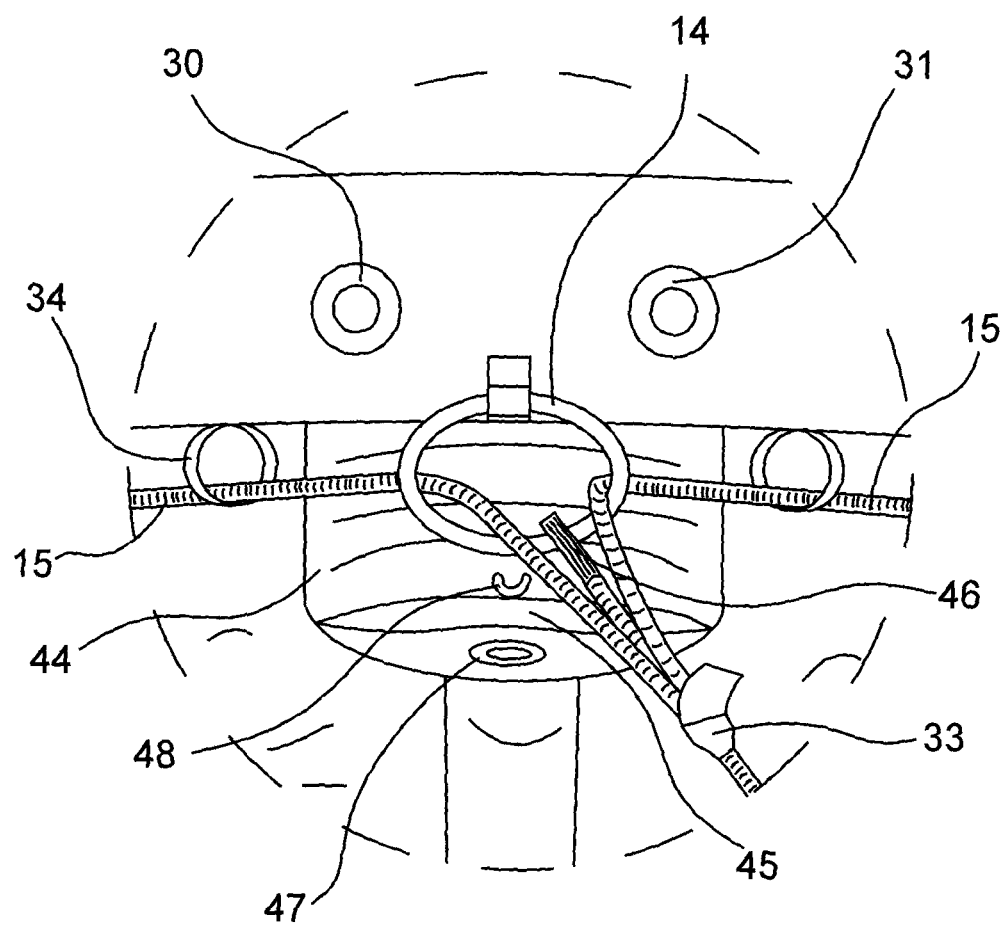
FIG. 16 is a view of FIG. 15, where the deflation control line has been tensioned, which tensioning pulls on and releases the tab used to contain the rolled-up air transfer bag.
Figure 17:
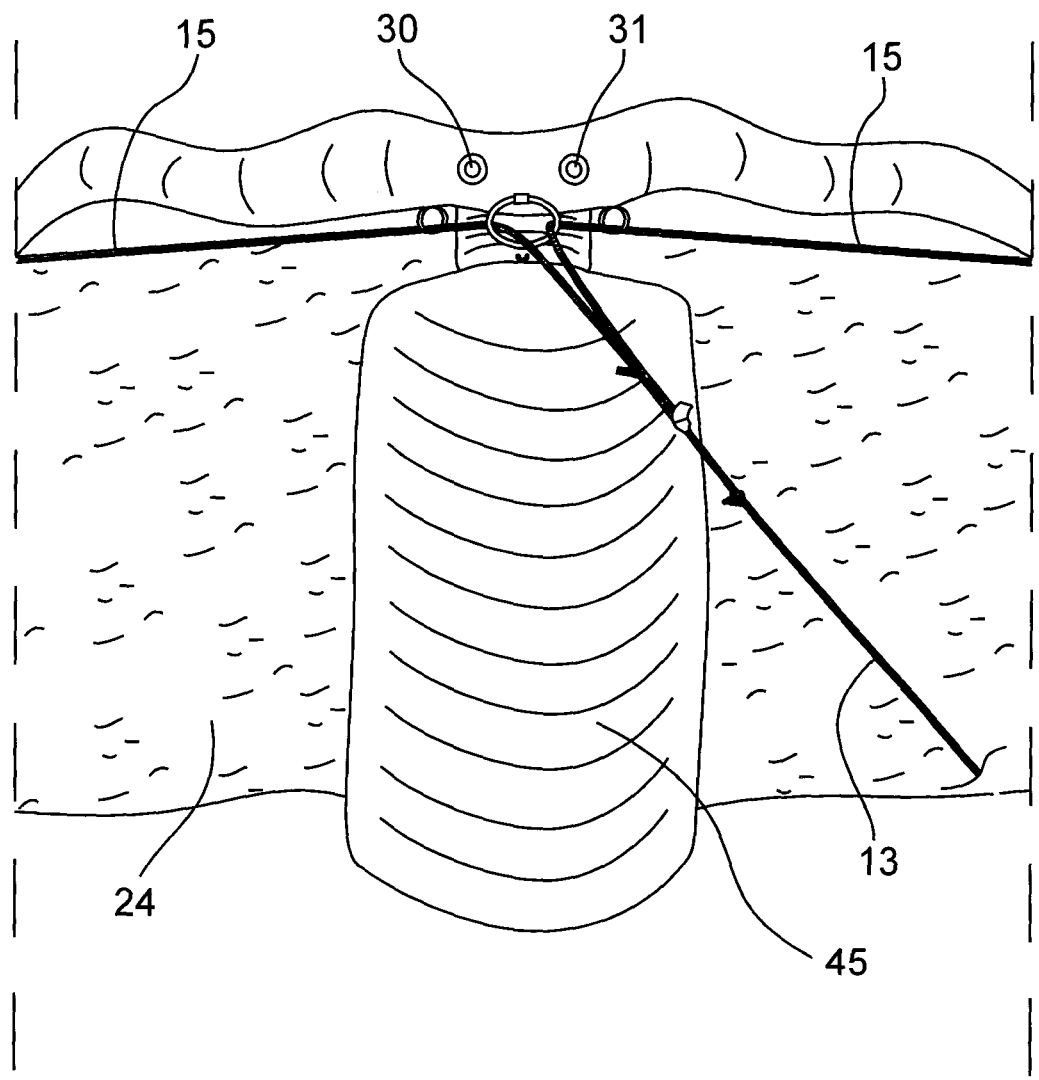
FIG. 17 shows the air transfer bag unrolled and partially pressurized with air from the bladder.

A rolled-up, un-inflated lightweight tube or bag may be attached to the wing 12 and is connected to the outlet of the valve 29 to receive air from the bladder 22 when the valve 29 is opened. The deflated kite 28 and partially inflated inner bag 45 which air-tight bag is contained within containment bag 44 depicted in FIG. 13. FIG. 14 shows the center portion of the kite's leading edge 22 with deflation control line 13 splitting into lines 15 with a short length of line 46 extending to hold containment bag 44 in a rolled-up format. A 2-way valve at the interface between the bladder 22 and inner bag 45 (not visible) connects the bladder 22 to the rolled-up air-tight bag 45. The valve is normally in the open position. When tab 46 is pulled, containment bag 44 unfurls due to the pressurized air in the bladder flowing into bag 45. The user can also use the open & closed position of the 2-way valve to repeatedly use bag system, comprised of bags 44 and 45, as an air pump to inflate the bladder when setting up the kite. FIG. 15 is an expanded view of part of FIG. 14. When line 46 is tensioned, it pulls line 46 out of retainer loop 48 (see FIG. 16) causing containment bag 44 to open, allowing rolled-up air transfer bag 45 to unfurl as air from the kite's bladder flows into bag 45 (as shown in FIG. 17) until the air pressure in the kite's bladder 22 and unfurled bag 45 are equalized. Bag 45 has a volume sufficient to reduce the 5-8 lb. pressure (above atmosphere) within said bladder to less than 1 lb. pressure above atmosphere within the combined bladder and unfurled bag volume.

The utility of this alternate embodiment, shown in FIG. 17, is that it provides the kite rider with flotation, as the air from the kite's bladder is not vented into the atmosphere, but rather it is distributed between the kite's bladder 22 and unfurled bag 45. Bag 45 is preferably made from a strong lightweight cover material such as Dacron polyester. Bag 44 and 45 can be shaped to provide optimum comfort while providing floatation for the kite rider returning to shore.

An additional feature of a bag system (comprised of bags 44 and 45) is that it can act as an air pump. For example, in the scenario where the kite rider is stranded on a distant shore, unfurled bag 45 can be manually rolled-up by the kite rider, forcing air back into the kite's bladder, thereby allowing the kite rider to re-launch and fly the kite. Additionally, bag 45 can be used as a manually-operated air pump to inflate the kite's bladder. The air passage between bladder 22 and bag 45 preferably contains a two-way valve, which valve can be manually set to allow air flow in only one direction. The same bag 45 can be used to inflate both the kite's bladder and also the struts.

Bag 45 can also be used to allow the kite rider to: (a) roll-up bag 45 to force air into the kite's bladder, (b) close an air-valve connecting the bladder to the bag, (c) unfurl the bag, (d) unzip or open bag 45 to allow more ambient air into bag 45, (e) seal bag 45 to the atmosphere, and (f) once again roll-up bag 45 forcing more air into the kite's bladder. This process can be repeated as required to pressurize the kite's bladder, or both the kite's bladder and struts.

Figure 21:
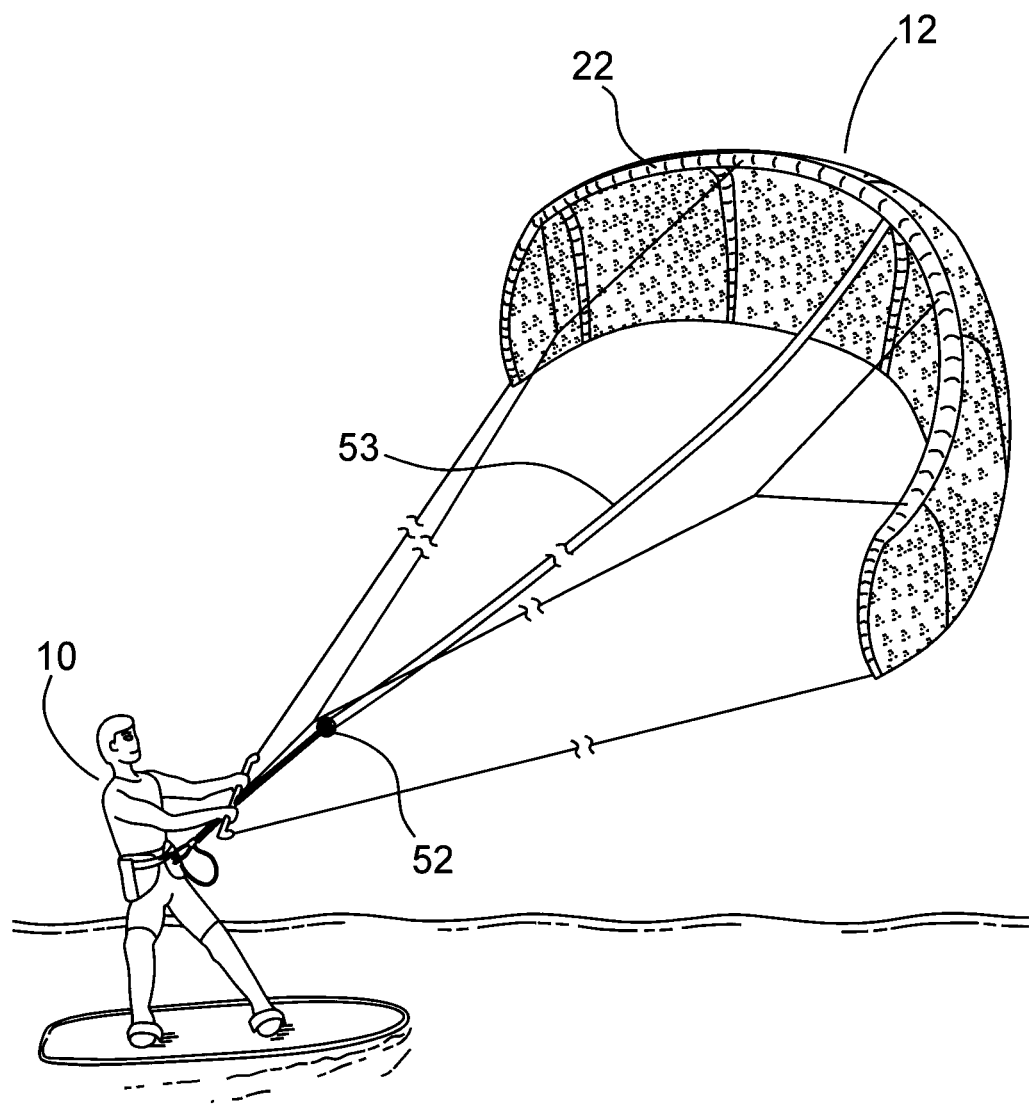
FIG. 21 shows the embodiment where a tube connects from the bladder to a bulb near the control bar; and, FIG. 22 shows the embodiment where the deflation control line connects from the bladder to a termination near the control bar.

In a further embodiment, kite rider 10, while tethered to a kite 12, can de-pressurize the kite bladder 22 by squeezing bulb 52 (see FIG. 21), which bulb is within 3 meters of the harness, and is connected to flexible tube 53, which tube has an inside diameter of 0.2-1.5 mm, an outside diameter of 1.5-4.0 mm, and is selected from a group comprising: an elastomeric polymer such as EVA (ethylene vinyl acetate), latex or a polymer such as polyethylene, polypropylene. Tube 53 connects to a pressure-activated air-valve (not shown) on the kite's leading edge bladder 22. By squeezing bulb 52, the air-pressure in tube 53 increases, thereby activating the pressure-activated air-valve, allowing air from the pressurized leading edge bladder 22 to vent into the atmosphere, deflating the bladder 22.

The invention therefore provides an effective means for quickly de-powering the kite by deflating the wing, and includes features allowing the wing to also be drawn into itself into a smaller footprint to further reduce its aerodynamic aspect.

In the foregoing specification, the invention has been described with reference to specific embodiments thereof. However, the scope of the claims should not be limited by the preferred embodiments set forth in the examples, but should be given the broadest interpretation consistent with the description as a whole. The specification and drawings are, accordingly, to be regarded in an illustrative rather than a restrictive sense.

The invention claimed is:

1. In a kite board system having a kite wing with an inflatable leading edge bladder to provide an aerodynamic shape to the kite wing when inflated, a control bar, a plurality of elongated outer steering lines and at least one elongated inner tether line for tensioned tethering of said kite to a harness to be worn by a user, a kite de-powering system comprising:
   a valve for selectively releasing air from said bladder; and,
   a deflation control line connectable to selectively open said valve and deflate said bladder, one end of said deflation control line terminating within three meters of said harness.

2. The kite de-powering system as in claim 1 wherein said deflation control line is operative to open said valve and deflate said bladder when tension is exerted along the deflation control line.

3. The kite de-powering system as in claim 2 wherein said kite system further comprises a leash, one end of said leash being attachable to said harness, said leash further being connected to said one end of said deflation control line whereby to tension said deflation control line against said harness when said tether line is detached from said harness and said kite wing is under power.

4. The kite de-powering system as in claim 3 wherein said kite system further comprises a chicken loop for retaining said tether line to said harness and said chicken loop is disengageable from said harness.

5. The kite de-powering system as in claim 1 further comprising an element on said deflation control line configured to be grasped and pulled by a rider while riding a kite board and using said kite board system to manually tension said deflation control line so as to open said valve and deflate said bladder.

6. The kite de-powering system as in claim 1 further comprising at least one length of line connected to said deflation control line, said at least one length of line engaging said kite wing at least two points spaced from one another along the kite wing, wherein drawing said deflation control line away from said kite wing causes said at least two points to draw toward one another so as to at least partially collapse said kite wing.

7. The kite de-powering system as in claim 6 wherein said deflation control line includes a branch of said deflation control line into two segments extending in opposed directions along said leading edge of said kite wing through loops attached to said kite wing, said two segments terminating and being secured near opposed wing tips.

8. The kite de-powering system as in claim 6 wherein said deflation control line includes a branch of said deflation control line into two segments extending in opposed directions along said leading edge of said kite wing through loops attached to said kite wing and said deflation control line is detachably connected to said valve in a vicinity of said branch.

9. The kite de-powering system as in claim 3 wherein said leash is adapted to be attached to both said deflation control line and to said tether line.

10. The kite de-powering system as in claim 9 wherein said deflation control line is longer than said tether line and whereby when said tether line is tensioned against said leash, said deflation control line is substantially untensioned.

11. The kite de-powering system as in claim 9 wherein said tether line is attachable to said leash at a point that is distal from said harness and said deflation control line is attachable to said leash at a point that is proximal to said harness whereby tensioning of said tether line against said leash leaves said deflation control line substantially untensioned.

12. A method for a rider of a kite board to rapidly de-power a kite wing while said kite wing is under power, said kite wing having an inflated leading edge bladder, said kite wing being tethered to a harness worn by said rider by means of at least one tether line and said kite wing being connected by outside steering lines to a control bar held by said rider, said method comprising a step of causing a valve on said bladder to open and release air from said bladder.

13. The method of claim 12 wherein said step of causing a valve on said bladder to open comprises causing a deflation control line to undergo tension, said deflation control line being attached to said valve and extending from said valve to a vicinity of said harness.

14. The method of claim 12 wherein said step of causing a deflation control line to undergo tension comprises releasing said control bar and relieving tension on said tether line.

15. The method of claim 14 wherein said step of relieving tension on said tether line comprises disengaging a chicken loop that attaches said tether line to said harness.

16. A method for a rider of a kite board to rapidly de-power a kite wing while said kite wing is under power, said kite wing having an inflated leading edge bladder, said kite wing being tethered to a harness worn by said rider by means of at least one tether line and said kite wing being connected by outside steering lines to a control bar held by said rider, said method comprising steps of:
 releasing said control bar; and,
 disengaging a chicken loop connecting said tether line to said harness whereby to cause said kite wing to tension a deflation control line secured to said harness and attached to a valve on said bladder, causing said valve to open and allowing said bladder to deflate.

\* \* \* \* \*